United States Patent
Levy et al.

(10) Patent No.: US 8,510,193 B2
(45) Date of Patent: Aug. 13, 2013

(54) METHOD FOR ACQUIRING DATA FROM A USER AT THE TIME OF A CARD PAYMENT MADE USING A PAYMENT TERMINAL

(75) Inventors: Bernard David Levy, Paris (FR); Laurent Bernard Marie Vieille, Paris (FR)

(73) Assignee: Jade-I, Paris (FR)

( * ) Notice: Subject to any disclaimer, the term of this patent is extended or adjusted under 35 U.S.C. 154(b) by 0 days.

(21) Appl. No.: 13/322,770

(22) PCT Filed: Jun. 7, 2010

(86) PCT No.: PCT/FR2010/051122
§ 371 (c)(1),
(2), (4) Date: Jan. 16, 2012

(87) PCT Pub. No.: WO2010/139915
PCT Pub. Date: Dec. 9, 2010

(65) Prior Publication Data
US 2012/0116846 A1    May 10, 2012

(30) Foreign Application Priority Data
Jun. 5, 2009 (FR) ..................................... 09 02715

(51) Int. Cl.
*G06Q 40/00* (2006.01)
(52) U.S. Cl.
USPC ............................................. 705/35; 705/40
(58) Field of Classification Search
USPC .................................................... 705/10–44
See application file for complete search history.

(56) References Cited

U.S. PATENT DOCUMENTS

| | | | |
|---|---|---|---|
| 5,700,149 A * | 12/1997 | Johnson et al. | 434/322 |
| 5,717,745 A * | 2/1998 | Vijay et al. | 379/112.05 |
| 5,790,664 A * | 8/1998 | Coley et al. | 709/203 |
| 7,650,388 B2 * | 1/2010 | Rodriguez et al. | 709/216 |
| 8,024,199 B2 * | 9/2011 | Arcieri et al. | 705/2 |
| 8,061,593 B1 * | 11/2011 | Graef et al. | 235/379 |
| 8,170,897 B1 * | 5/2012 | Cohen et al. | 705/7.13 |
| 2001/0037206 A1 | 11/2001 | Falk et al. | |
| 2006/0261144 A1 | 11/2006 | Foss | |
| 2007/0073621 A1 * | 3/2007 | Dulin et al. | 705/50 |

(Continued)

FOREIGN PATENT DOCUMENTS

| WO | WO-00/74011 A2 | 12/2000 |
|---|---|---|
| WO | WO-2009/050529 A2 | 4/2009 |

OTHER PUBLICATIONS

International Search Report (in French with English translation) for PCT/FR2010/051122, mailed Oct. 4, 2010; ISA/EP.

*Primary Examiner* — Frantzy Poinvil
(74) *Attorney, Agent, or Firm* — Harness, Dickey & Pierce, P.L.C.

(57) ABSTRACT

The invention relates to a method for acquiring data from a user at the time of a card payment made using a payment terminal, in which: a data acquisition request is displayed (26) on a screen of the payment terminal following the completion of the payment transaction; the data is acquired (28) by the payment terminal; the acquired data is validated (30) in the terminal; and, if the data is valid, the data is transmitted (34 or 37) by the payment terminal to a consolidation server and a card removal authorization message is displayed (36) on the screen of the terminal. The acquisition includes a maximum period parameter and the data is considered to be invalid if acquired after said maximum period and/or if acquired when the chip card is not in the payment terminal.

15 Claims, 7 Drawing Sheets

(56) References Cited

U.S. PATENT DOCUMENTS

| | | | |
|---|---|---|---|
| 2007/0239516 A1* | 10/2007 | Smith et al. | 705/10 |
| 2008/0021817 A1* | 1/2008 | Epple et al. | 705/39 |
| 2009/0132813 A1* | 5/2009 | Schibuk | 713/158 |
| 2009/0254531 A1* | 10/2009 | Walker et al. | 707/4 |
| 2011/0047045 A1* | 2/2011 | Brody et al. | 705/26.41 |
| 2012/0130786 A1* | 5/2012 | Marshall | 705/14.17 |

* cited by examiner

METHOD FOR ACQUIRING DATA FROM A USER AT THE TIME OF A CARD PAYMENT MADE USING A PAYMENT TERMINAL

CROSS-REFERENCE TO RELATED APPLICATIONS

This application is a 371 U.S. National Stage of International Application No. PCT/FR2010/051122, filed Jun. 7, 2010, and claims priority to French patent application No. 0902715, filed Jun. 5, 2009, the disclosures of which are herein incorporated by reference in their entirety.

This invention relates to a method for acquiring data coming from a user at the time of a card payment made using a payment terminal and a computer program for implementing the method.

Different means are known for obtaining a user's opinion of a service or a purchase that he or she has made.

For example, if the purchase has taken place remotely by means of the Internet and the purchaser has left an email address for the vendor, then the vendor, directly or by means of a service provider, can send an email to the purchaser some time after the purchase, asking him or her to complete an online questionnaire on his or her satisfaction with the purchase.

Another means consists of asking purchasers to leave evaluations on specialized sites, evaluations that will be freely available to other users of the site. Thus, there are, for example, sites that list restaurants in a city or a region and the provide, in addition to a restaurant index, and optionally comments by site managers, a forum area where the consumers can leave evaluations relating to the restaurant(s) listed.

These types of comments can be accompanied by a sort of consolidated classification comprised of an average of an evaluation rating given by the various users.

In reality, it appears that, for example, at restaurant sites, each restaurant is rated only by a very small minority, often fewer than ten people, often with highly contrasting opinions, and therefore the representativeness of the opinions collected is very low and difficult to use, and, moreover, it is often uncertain that the voter was an actual consumer.

It would therefore be especially advantageous to establish a reliable method for acquiring opinions that makes it possible to collect a sufficiently representative number of opinions, obtained in a reliable manner.

To solve one or more of the aforementioned disadvantages, a method for acquiring data coming from a user at the time of a card payment made using a payment terminal comprises:

after closure of the payment transaction, providing a data acquisition request on a screen of the payment terminal;

acquiring the data by means of the payment terminal;

validating the data acquired in the terminal;

if the data is valid, transmitting the data from the payment terminal to a consolidation server and providing the user with validation message on the screen of the terminal.

The data is considered to be invalid when, as the acquisition comprises a maximum time period parameter, the data is acquired after this maximum time period.

This method thus advantageously makes it possible to collect a reliable opinion from customers, given that it is acquired systematically and quickly and without the vendor being capable of easily intervening in order to change the vote.

The following are specific features or embodiments:

it also comprises, if the data is invalid:
  transmitting failure information from the payment terminal to the consolidation server, and
  providing the user with a validation message on the screen of the terminal;

if the payment transaction is a payment transaction using a smart card, it comprises a step of validation based on the presence of the card;

the acquisition request and the presentation thereof on the screen of the payment terminal are personalized by the consolidation server, then transmitted from the consolidation server to the payment terminal;

the transmission of the data from the terminal to the consolidation terminal is considered to be completed by the terminal upon receipt of a response message sent by the consolidation server, in which said message is sent by the server before validation by the server of the data;

if the data is not validated by the consolidation server, the data is not consolidated by the consolidation server and the overall statistical result is not affected by the data non-validated by non-consolidation of the entire acquisition request;

as the acquisition request is part of a set of requests defining a survey campaign, in which said campaign is conducted via one or more payment terminals on which a plurality of payment transactions are preformed, the personalization is performed by the consolidation server in order to distribute the requests of the set of requests of the campaign being conducted over the multiple payment transactions so that the consolidation of the data collected by the payment terminal(s) makes it possible to use the statistical law of large numbers in order to obtain statistically significant results;

the personalization takes into account non-identifying parameters associated with the user, coming from the consolidation server or the card of the user;

the acquisition request is adapted so as to collect a plurality of data consecutively;

the personalization defines a variable order of collection of the plurality of data, in which the variable order is dependent on parameters associated with the user or with the environment;

as the payment terminal comprises an interpreter of a series of instructions for displaying the acquisition request or a plurality of acquisition requests on the terminal and collecting the data or the plurality of data, said interpreter blocks the backward branching instructions and limits the operating time so that no series of instructions can lead to an endless execution;

as the PIN code of a card comprises N digits, the interpreter prohibits the entry of more than N−P data, with P being greater than or equal to 1, so as to prevent a series of instructions loaded malevolently in the terminal from leading the user to enter the secret code of the bank card;

the consolidation server associates the acquired data with non-identifying data qualifying the user via the time of acquisition of the acquired data.

In a second aspect of the invention, a computer program comprises program code instructions recorded on a computer readable medium of a mobile device such as a payment terminal, for implementing the steps of a method as described above.

In a third aspect of the invention, a statistical information collection system comprises a consolidation server. The consolidation server is connected to one or more payment terminals performing a plurality of payment transactions, and comprises:

a storage for a list of questions to be asked of users;
    a computer calculating a query plan for the plurality of payment terminals, in which said plan defines, for each payment transaction, a sub-set of the list of questions;
    communication interfaces with each payment terminal for transmitting, to each terminal, the sub-sets of questions in the form of acquisition requests and for collecting data corresponding to the questions assigned to the terminal, in which the terminal(s) is (are) designed to implement the acquisition method described above;
    a storage for the list of answers returned by the users;
    a statistical computer for consolidation of the data acquired by using the law of large numbers.

The invention can be better understood in view of the following description, provided solely by way of an example, and in reference to the appended figures, in which.

Figure 1:
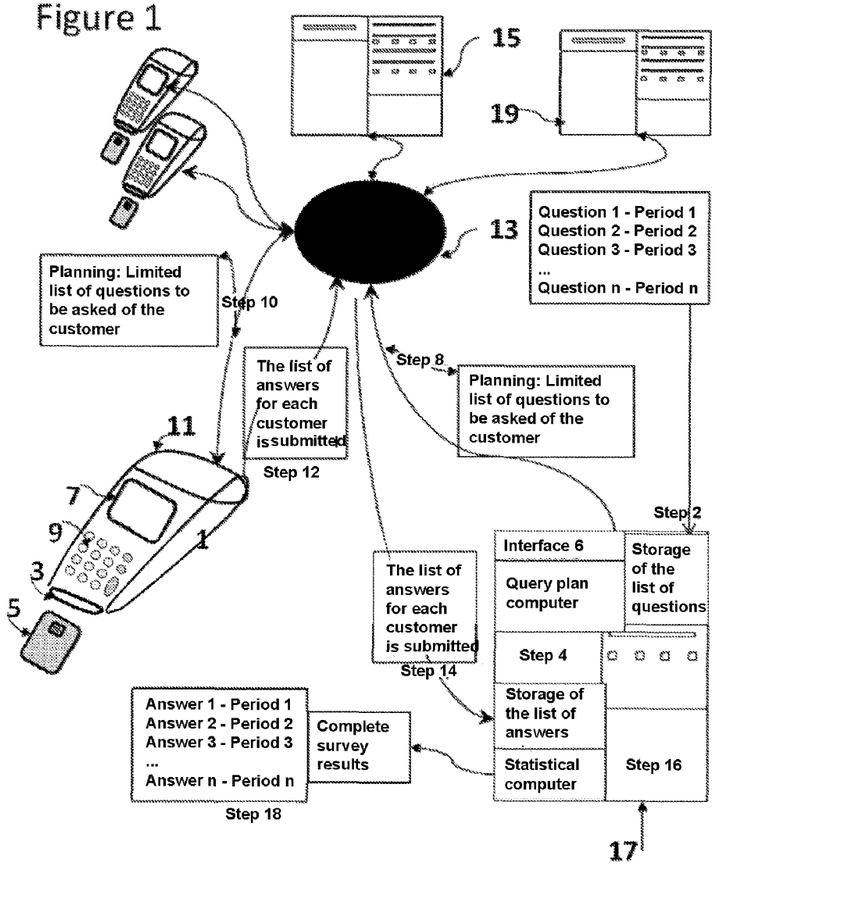
FIG. 1 is a diagrammatic view of an acquisition system according to an embodiment.

In reference to FIG. 1, a payment terminal 1 comprises a connection medium 3 for a smart card 5, a screen 7 and a keypad 9 as well as means 11 for communication with a data network 13. All of these elements can be combined in a self-contained terminal, or can be separated or duplicated; it is possible, for example, for there to be a plurality of keypads and a plurality of screens. By means of this data network, the payment terminal 1 is connected to a payment server 15, to a consolidation server 17 and to a remote maintenance server 19.

The smart card 5, the payment terminal 1 and the payment terminal 15 preferably conform to the most recent standard in effect, for example the EMV (Eurocard/Mastercard/Visa) standard 4.2, which can be downloaded at the website http://www.emvco.com/specifications.aspx?id=155.

The payment server is, for example, a secure server managed by a banking or financial organization. The maintenance server and the consolidation server are server-type computing machines. The maintenance server is, for example, managed by a computer service company in charge of maintenance of terminals. The consolidation server enables the preparation of question campaigns, the collection and the statistical consolidation of answers. It is used, for example, by a marketing service company, specializing in satisfaction analysis campaigns, or by a vendor continuously seeking information on customer satisfaction with the service provided.

The questions to be asked in one or more survey campaigns are defined and stored in step 2 in the consolidation server 17, which server has a computer that defines, in step 4, for each terminal and each customer, the question or subset of questions that will be asked of the customer according to parameters such as the date, time and order number of the customer.

This question plan is transmitted in step 8, via the interface 6, to the network 13, then, in step 10, to the payment terminals concerned.

The terminals submit the answers in step 12 to the network 13. In step 14, these answers are provided to the consolidation server 17. This server has a statistical computer that establishes, in step 16, the results of all of the surveys according to the answers received from the payment terminals, and presents the complete results of the surveys in step 18.

In other embodiments, the different storages and computers may, for example, not be combined in the same consolidation server.

Figure 2:
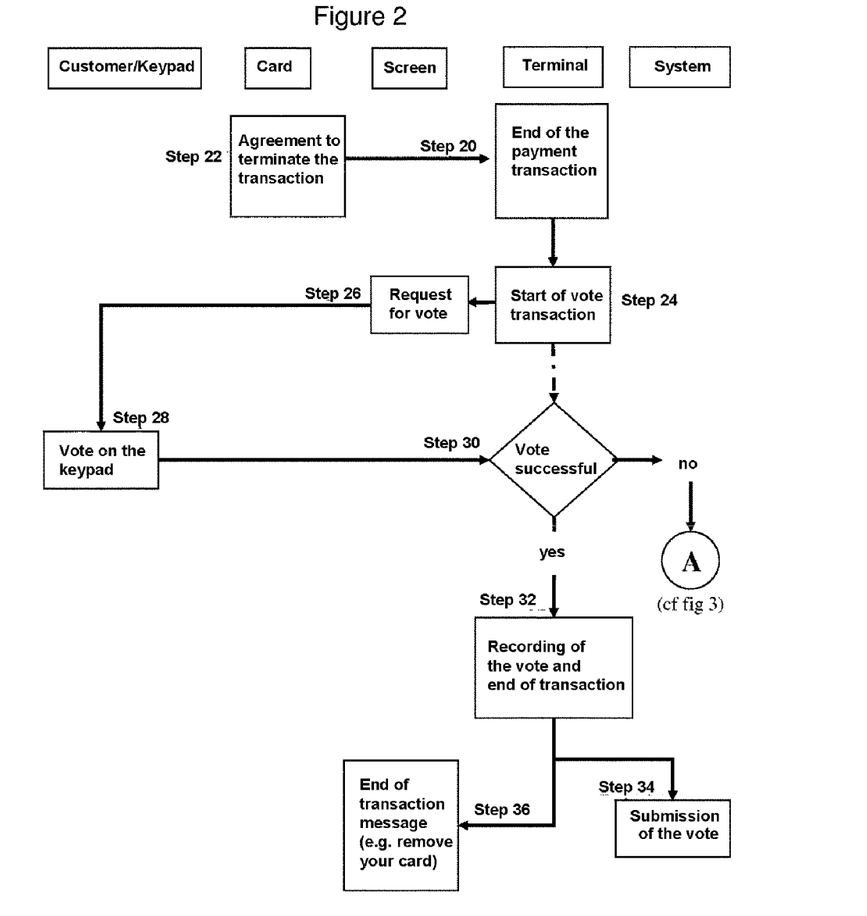
FIGS. 2 and 3 show a flow chart of an acquisition method according to an embodiment of the invention.
Figure 3:
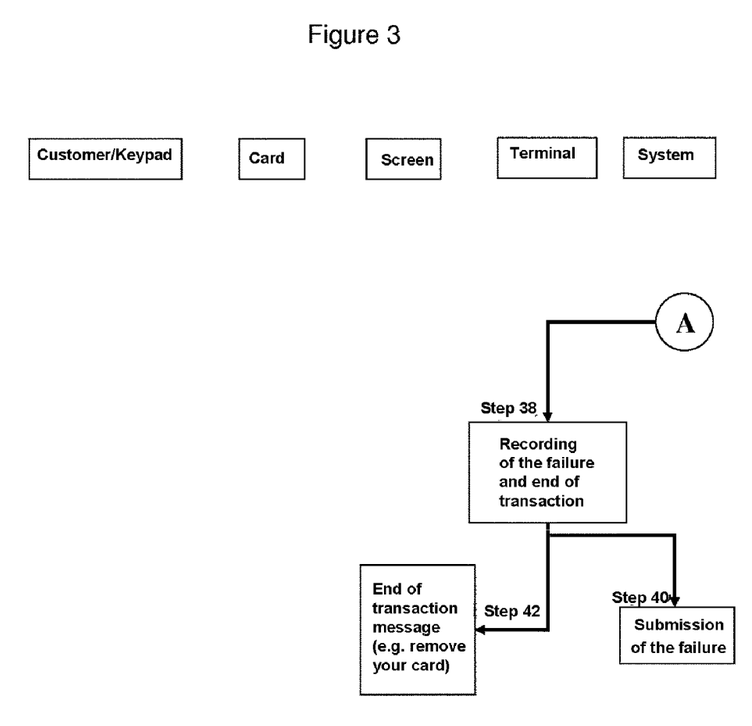

FIG. 2 is a flow chart of an embodiment of an acquisition method using the means described in reference to FIG. 1. To enable the different flows to be viewed, each means performing a step is indicated on a line at the top of the figure, and the steps performed by a given means are located on the vertical of same; the system includes in particular the different servers of FIG. 1.

The data acquisition method comprises:
    end of the payment transaction, step 20, after acceptance provided by the card 5, step 22. This corresponds, for example, to step "10.11 Completion" of standard EMV 4.2; this often results in a "Payment accepted" message on the terminal display screen; in other cases, for example, in the case of a magnetic strip card, the acceptance may be provided by the system;
    start of the acquisition operation, step 24;
    presentation, step 26, of a personalized data acquisition request on the screen 7 of the payment terminal;
    acquisition, step 28, of the data on the keypad 9 of the payment terminal;
    validation, step 30, in the terminal, of the acquired data;
    if the data is validated,
    1. recording, step 32, of the data;
    2. transmission, step 34, of the data from the payment terminal to the consolidation server 17, and
    3. presentation, step 36, to a user, of a validation message, which may be the authorization to remove the card on the screen 7 of the terminal in the case of a smart card;
    if the data is not validated,
    4. recording, step 38, of the failure;
    5. transmission, step 40, of the failure from the payment terminal to the consolidation server 17, and
    6. presentation, step 42, to the user, of a message authorizing removal of the card on the screen 7 of the terminal in the case of a smart card.

The acquisition step 28 comprises a maximum time period for entry of the data. After this time period, the data is considered to be invalid and the terminal may terminate the session. This is particularly advantageous in the context of a payment. Indeed, at this time, both the customer and the vendor want the entire transaction to take place quickly. However, if a maximum time period is not provided for data entry, the terminal may be blocked in entry standby mode. In addition, it may also provide an opportunity for an incorrect answer to be left by enabling, for example, the vendor to take over the terminal and answer the question him or herself. To prevent this, a maximum time period of several seconds, for example between 5 and 10 seconds, is a good compromise for enabling the question to be read and understood and the answer to be entered almost spontaneously.

Similarly, the entry time period may be limited by the obligatory presence of the card in the payment terminal. Indeed, as long as the card is present in the terminal, it is reasonable to assume that the customer is still in possession of or near the terminal. Thus, in the conventional smart card payment diagram in which the messages "Payment accepted" and "Remove the card" are linked, the set of acquisition steps are advantageously performed between these two messages.

The method described can advantageously be implemented in the form of a computer program, for example, a script, made up of instructions. This computer program is then installed in the control means of the payment terminal in order to control the different means of the payment terminal in the execution of the method described.

The consolidation server also comprises a computer program for preparing and sending the questions to the payment terminals and for collecting the information sent by the terminals, transmitting it or synthesizing it. This synthesis can then be presented to consumers in the form of a website for rating and comparing vendors.

The data acquisition request can be in the form of a personalized question. The personalization is achieved by means of the consolidation server according to requests received by said server. The question itself can thus vary according to the time, the place, the business itself, or other parameters. The other messages that appear on the screen as well as the display can also be personalized and are a personalization of the acquisition request.

If the terminal is connected in real time to the consolidation server, the acquisition request can advantageously take into account purchases made by the customer, and known to the consolidation server, in order to personalize the question to be asked.

The validation of the data makes it possible to ensure, with a sufficient degree of confidence, that the data has indeed been entered by the customer, in order to have sufficiently reliable data.

As the terminal generally has a small screen and the customer is generally in a hurry to complete the transaction, the number of questions and the complexity thereof must be minimized. It may thus be considered to be ergonomically advantageous not to exceed three simple questions that can be answered by means of a single keypad stroke.

This limitation may mean that the survey campaigns using this information collection method obtain much less information than "conventional" survey campaigns conducted by telephone, Internet questionnaire, etc., campaigns often comprising some twenty questions with multiple selections, questionnaire path trees based on answers to certain questions, and so on.

This limitation may also prevent a plurality of survey campaigns needed by different people or companies from being conducted at the same time.

To overcome this limitation and obtain results statistically having the same qualities as "conventional" campaigns, it is proposed to use the statistical law of large numbers, thus making it possible to obtain statistically valid results in order to determine changes in user opinions, or compare user opinions, for example, on services provided by different businesses but with a comparable activity, or user opinions on a service provided at different time periods, for example in the morning and in the afternoon, or during the week and during the weekend.

These opinions are collected using the method described above in the various contexts to be compared.

The systematic nature of this opinion collection makes it possible to obtain a large number of answers for the same question. Statistical laws (the law of large numbers) ensure that it is sufficient to obtain the opinion of a representative sample of users concerned in order to obtain a statistically valid result, i.e. almost certainly close to the average result that would be obtained by querying all users concerned. Thus, querying a large number of customers, each on a limited number of the set of questions to be asked for the survey campaign(s) being conducted, makes it possible, according to the law of large numbers, to obtain a representative measurement of the opinion of all of the customers on all of the questions of the campaign or all of the campaigns being conducted. The consolidation server makes it possible to combine all of the campaigns as if all of the questions came from the same campaign, and to ask each customer only a small number of questions.

However, for these results to be capable of being used effectively, it is important to make sure that:
the number of answers to each question is large enough to be statistically valid or for the number of answers to be indicated in order to inform the person using this data;
the results for each time period considered and for each terminal to actually be comparable and be capable of being combined in a statistically correct manner.

As an example, we will consider a store with two different terminals:
a terminal T1 asks a question 30 times to its customers during a day, obtains an average rating of 5 for this question, and then asks other questions of 470 customers during the same day. Then the 30 ratings averaging 5 are representative of 500 users; and
a terminal T2 asks the same question 30 times of its customers during a day, obtains an average rating of 3, and does not have any other customers.

The average 5 obtained by a sample of 30 questions on terminal T1 is then representative of the opinion of 500 customers; the average 3 obtained by a sample of 30 questions on terminal T2 is then representative of the opinion of 30 customers. The average representing the opinion of the 530 customers cannot be calculated by obtaining the average of 3 and 5, even if the representative samples are the same size. The said average must be calculated by weighting according to the population represented by each separate average. Thus, in this case, (5*500+3*30)/530, i.e. around 4.89.

To enable statistically valid results to be compared, the method comprises:
on the consolidation server, before the survey is launched, enabling people requesting the survey to program the questions to be asked and to define the contexts for which they wish to compare customer opinions. These contexts can be defined, for example, as businesses, as parts of businesses, as groups of businesses, as time periods, or as groups of time periods, or combinations of these criteria.
By the consolidation server, while the survey is being conducted:
storing an initial estimate, then optionally a historic estimate, of the number of payments made on each point-of-sale terminal and for each time period. This estimate makes it possible to determine the minimum number of point-of-sale terminals and the minimum time period making it possible to obtain these statistically valid samples. These estimates are dependent on the frequency at which the question is asked of the customer: if the question is asked of one out of ten customers, it will be necessary to have twice as many payment transactions to obtain, for example, 50 answers, as if the question is asked to one out of five customers. These estimates are brought to the attention of the person requesting the survey, when it is programmed, explicitly or implicitly in the choices offered to him or her.

verifying, when consolidating the results, that statistically valid samples have clearly been obtained, or displaying the number of questions asked or answers obtained.

By each payment terminal, submitting all of the results to the consolidation server:
  date and time at which a question has been asked;
  identifier of the question asked;
  vote, or information indicating that the customer has not voted;
  date and time of each payment transaction, even if no question has been asked;

by the consolidation server, applying the statistical calculation rules to this information in order to present, to people consulting the results of the surveys, statistically valid results. In particular, calculating the statistical values, such as averages, standard deviations, with valid weighting for the populations represented by large enough samples.

This use of the law of large numbers enabling few questions to be asked to a large number of customers is not limited to campaigns using the payment means as described above. Indeed, it can be used in other environments in which it is desirable, to obtain a good return rate, for the response to a questionnaire to be very quick. For example, it is possible to use this statistical technique in survey campaigns using the Internet or email as a medium.

In an alternative, the method makes it possible to collect the customer's opinion on a sequence of questions, instead of on a single question, in the same payment terminal context. In fact, certain payment terminal use contexts make it possible to ask the user's opinion not only on a question, but on such a sequence of questions. These contexts include cases in which the context enables, encourages or requires extended interaction with the customer.

The person ordering such a survey generally seeks to ask different questions of the customer, not only according to external criteria such as the date, time, and language, but also according to his or her answers to previous questions.

Some of this data can be obtained from data present in the user's payment card. For example, the language in which a question is presented is generally the usual language of the country in which the terminal is used. However, it is often possible to deduce the user's preferred language from data stored in the card. It is then possible to express the question in the user's preferred language, or in a language more commonly understood than the usual language of the country. This is particularly beneficial for vendors with foreign customers.

In general, it is possible to request, at the time of the payment application, for the communication of information deduced from card data, information not enabling the user to be identified so as not to compromise confidentiality and security, but enabling the question asked of the user to be adjusted. This data, which we will call "non-identifying" includes: the language (to adjust the language in which the question is expressed), the sex (for grammatical agreement), and so on.

To enable such dynamic sequences of questions to be taken into account, the method comprises:
  by the consolidation server, enabling the person requesting the survey to express these dynamic sequences;
  by the consolidation server, expressing these sequences in a computational representation (i.e. operations characterized by a tag) enabling the interpreter in the terminal to properly perform said sequences;
  by the payment application, communicating certain information not enabling the user to be identified to the interpreter having questions, in order to enable the expression of the question to be adjusted;
  by the interpreter in the terminal, executing each operation one after the other, accessing both external and internal information in order, for example, to select the next questions, collect the user's vote and store the result thereof. In particular, evaluating criteria including the date, time, language spoken by the purchaser, or the answers provided to previous questions.

Figure 4:
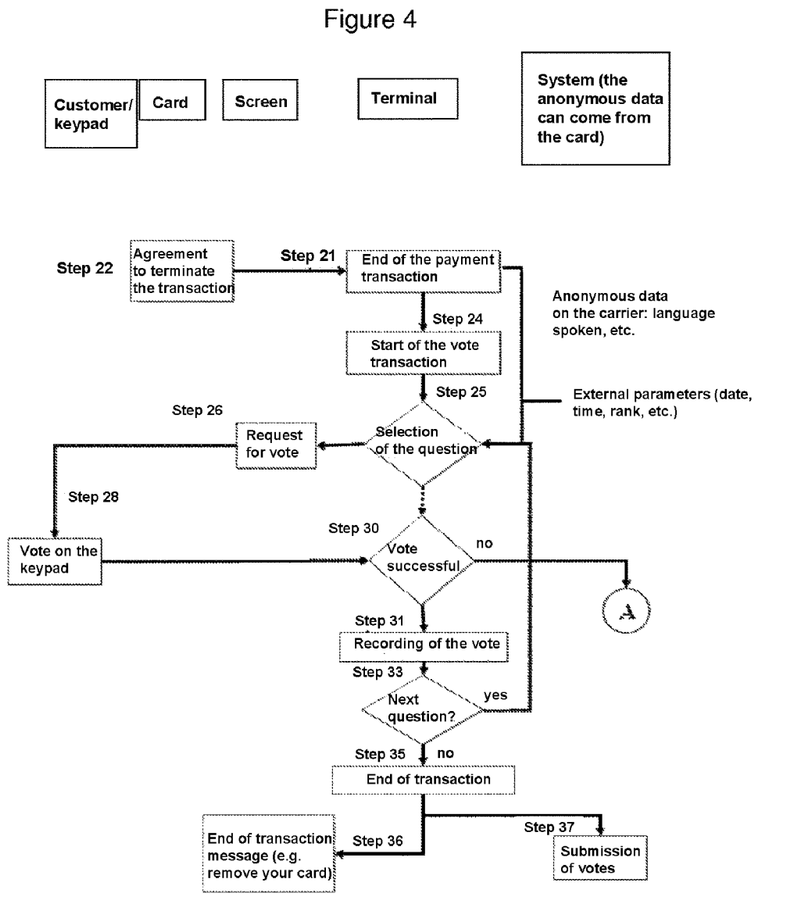
FIG. 4 shows a flow chart of an alternative of the method of FIG. 2.

FIG. 4 is a flow chart of an embodiment of the acquisition method above, using the means described in reference to FIG. 1. It is therefore an alternative of the method described in reference to FIG. 2 enabling the person ordering the survey to specify lists of questions to be asked in a vote transaction, and the consideration of internal parameters (transaction time period, previous values, etc.) or external parameters (date, time, language spoken by the carrier, customer rank). As in FIG. 2, each means performing a step is indicated in a line at the top of the figure, and the steps performed by a given means are on the vertical thereof.

Steps 24, 26, 28, 30, 36 and A are identical to those of FIG. 2. Step 20 is replaced by step 21. Step 32 is replaced by steps 31, 33 and 35. Step 34 is renumbered as step 37.

In reference to FIG. 2, the following steps have been added:
  End of transaction and transfer of anonymous information on the carrier, step 21;
  Selection of the question to be asked, step 25, according to the programming desired by the person requesting the survey, and, according to this programming, consideration of external parameters (date, time, customer rank, language spoken by the customer), and, if it is not the first question, consideration of internal parameters (such as the history of the list of questions, the time spent responding to said list, and the previous votes in the list of questions);
  Recording of the vote, step 31;
  Determination, step 33, according to the programming desired by the person requesting the survey, of the existence of another question to be asked;
  End of the transaction, step 35; and
  Submission of votes, step 37, to the consolidation server.

When the answers are time-stamped, this also makes it possible to match the answers with other information, whether anonymous, such as the purchases made, or non-anonymous, such as the purchaser's contact information.

It may be particularly advantageous for a business to perform this matching in order to take their statistical studies further. This method makes it possible in particular to conduct very precise studies while maintaining the anonymity of purchasers.

Figure 5:
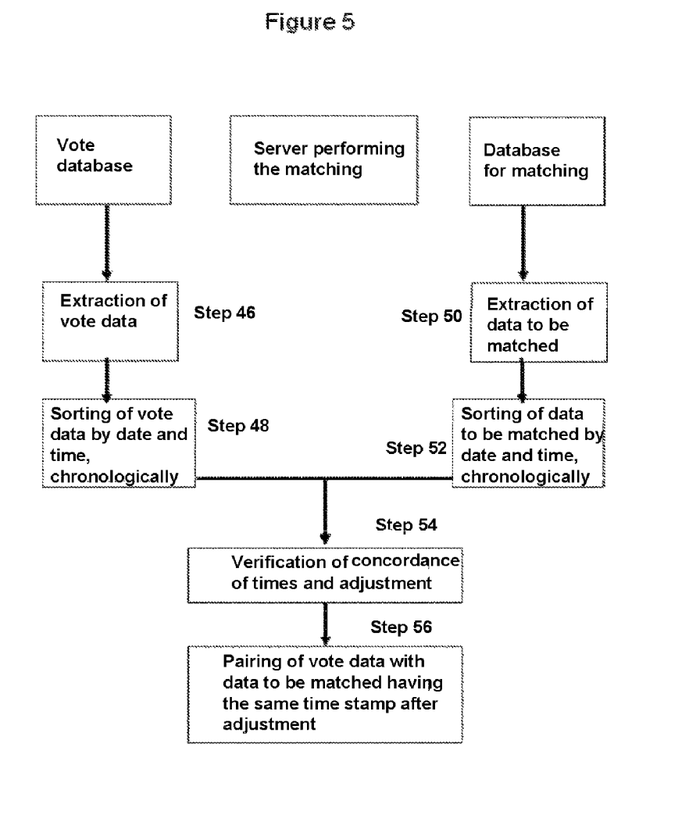
FIG. 5 shows a flow chart of a consolidation method according to an embodiment of the invention.

FIG. 5 is a flow chart of an embodiment of a method for matching data, which can remain anonymous, and enabling the surveys conducted to be taken further. To enable the various flows to be displayed, each means performing a step is indicated on a line at the top of the figure, and the steps performed by a given means are located on the vertical thereof. The system includes in particular the different servers in FIG. 1.

The method for matching data comprises:
  Extraction, step 46, of time-stamped vote data obtained from the submission of votes after step 34, according to FIG. 2, or step 37, according to FIG. 4;
  Sorting of vote data by date and time, in chronological order, step 48;
  Extraction of data that must be matched with vote results, such as the lists of purchases made, step 40;

Sorting of data to be matched by date, in chronological order, step 52;

Verification of the concordance of times, and adjustment of times if necessary according to differences in clock adjustments of the different computers, step 54; and Pairing of data having the same time stamp after adjustment, step 56.

It should also be noted that the installation of the computer program in the payment terminal requires servers, conventionally terminal maintenance servers, to be suitable for installation of the corresponding program on the payment terminal. These operations can be done in certain cases during operations of remote maintenance and updating of software of the payment terminal.

The computing technique methods intended to ensure communication between the consolidation server and the terminals in order to enable the operation for the method described above on the terminal must take into account the following parameters:

The terminals are geographically dispersed.

There are a wide variety of types of terminals;

Their computing capacity and memory are limited;

Their mode of connection to networks is sometimes slow and episodic, such as at remote sites, for example;

The terminals must remain available, given the essential nature of the payment for a business;

The security of data and programs used for the payment transaction must not be compromised;

The number of terminals to be served by a consolidation server is larger than the number of terminals served by an electronic cash system, given that the vote application can be installed on all of the terminals, regardless of the associated electronic cash system;

The security of personal data of the card carrier must be preserved: in particular, any possibility of "phishing", consisting of malevolently obtaining the confidential data of a user (PIN), must be prohibited.

Under these conditions, the known methods can be reinforced in the following points.

The prior art, for the production of the software part in the terminal and in charge of executing the sequence of questions (steps 33 and 24 in the flow chart of FIG. 4) consists of interpreting a script language, or of a virtual machine executing a sequence of instructions obtained by pre-compilation. These two approaches, in general, do not guarantee the termination of the execution or the absence of "phishing". In fact, if a terminal incorporates a general script interpreter, or a virtual machine interpreting a general programming language, it is possible:

To transmit a script to a terminal and for the execution of said script to never be terminated. This will negatively affect the availability of the payment terminal.

To transmit a script to a terminal and for the execution of said script to require the user's PIN code, to collect it and transmit it in return to the owner of the script without the knowledge of the card holder.

In addition, the known protocols for collecting the data from terminals are secure (to prevent sensitive information from being compromised), reliable (to prevent loss of transaction data), and result in some complexity in exchanges. In particular, a plurality of message exchanges, in addition to connection exchanges and disconnections, are necessary in order to ensure these features. This security, reliability and complexity are not compatible or necessary in consideration of the following requirements:

The number of terminals to be served by a consolidation server for the vote may be greater than the number of terminals served by an electronic cash system, given that the vote application can be installed on all of the terminals, regardless of the associated electronic cash system;

The statistical and purely informational nature of the votes does not require complete reliability of the transmission; and The anonymous nature of the votes does not require securing of personal data.

To ensure that the execution is systematically terminated, the payment terminal advantageously comprises:

A virtual machine capable of interpreting a sequence of instructions, in which each instruction is characterized, for example, by a tag and containing, for example, a test and an operation:

The test is limited to simple tests, for example, the verification of Boolean values or the comparison of two values; these values can be constant or taken from a limited list of external data such as the time, date or language; if the test fails, the operation is not executed, and the next operation is considered;

The operations are limited to:

An operation of displaying the screen specified in the instruction and of collecting the data;

A skipping operation, enabling a positive number of instructions to be skipped. This number can only be positive, therefore making it impossible to go backwards in the sequence;

Various value manipulation operations: increment, Boolean value change, copy.

A module separate from the virtual machine, and called upon by the display and collection instruction of said virtual machine, executes the operation of displaying the screen and collecting a single datum. The capacity of the consolidation server to parameterize the execution of this module is limited due to its separation from the virtual machine:

The module can collect only one datum;

This datum comprises only one digit or character.

These instruction sequences are generated by the consolidation server from question and question sequence programmings expressed by people requesting campaigns.

It is easy to believe that:

It is impossible to generate a finite sequence of instructions of which the execution will not be terminated;

It is impossible to collect the confidential code of a user by means of a single execution of the module for displaying and collecting the data;

The limitation of the number of executions of the screen display and vote collection module, so that this number is strictly smaller than the number of digits or characters in the secret codes (often 4), makes it possible to prevent the confidential code of the card from being collected.

Thus, even if the exchanges between the terminal and the exchange server were compromised by a malevolent attack, it would be impossible for the attacker to cause the terminal to execute a question or a list of questions leading the user to enter the confidential code on his or her card.

An alternative to this approach consists of enabling the execution of dynamic question sequences in order to collect a plurality of data only after the card has been removed, so as to clearly show the user that the context is no longer a payment and card use context.

Figure 6:
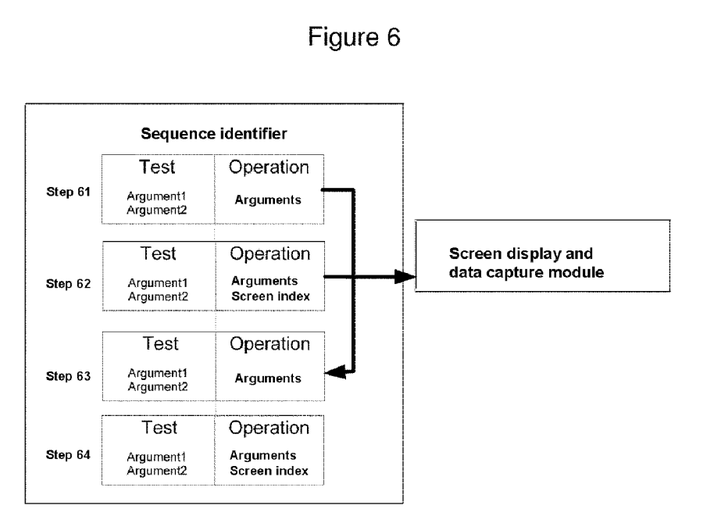
FIG. 6 shows a partial illustration of the execution of instructions of a virtual machine on a payment terminal according to an embodiment of the invention.

As an example, FIG. 6 shows several steps selected from an instruction sequence. In the first step 61, the test, if successful, leads the interpreter to directly consider the third step, ignoring step 62. If step 61 fails, then the operation of step 62 is executed. This operation includes a call to the separate module, enabling the screen to be displayed and the data to be captured. The display of the screen and the capture of the vote are not allowed directly by the interpreter, making it possible not to accept instruction sequences producing uncontrolled displays and captures. A skip of instructions, as possibly performed between step 61 and step 62, is allowed only "before", thus ensuring the termination of any finite sequence of instructions.

Figure 7A:
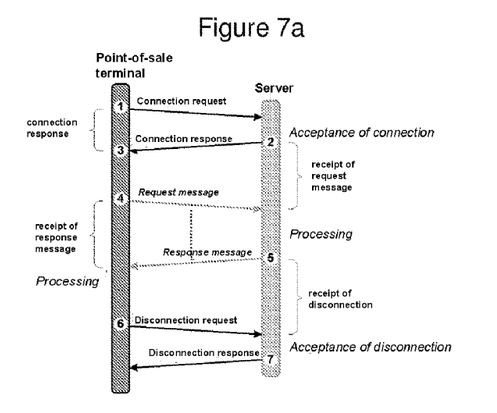
FIG. 7 is a diagrammatic view of certain aspects of a communication protocol according to an embodiment of the invention.

To ensure the distribution of terminal programmings and the collection of votes while taking into account the very large number of terminals and the anonymous, statistical and purely informational nature of the results, the data transmission protocol comprises the following features:

A standard exchange between a terminal and the consolidation server, limited to the following exchanges (FIG. 7*a*):
  A request to establish a connection by the terminal and an acceptance by the consolidation server. This exchange is limited to establishing the exchange parameters.
  A request message by the terminal, which message includes the transmission of the results of the vote to the server.
  A response message by the server, which message includes a new programming of the terminal, if necessary.
  A request for disconnection by the terminal, followed by acceptance by the server.

Figure 7B:
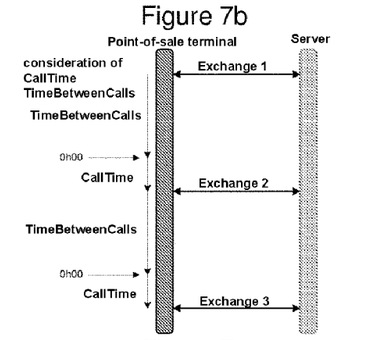
Figure 7C:
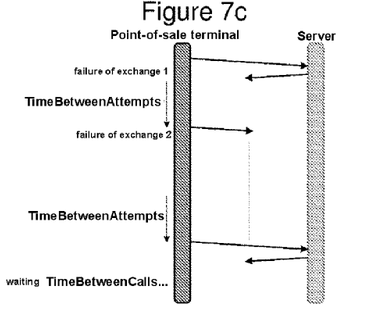

In the event of a failure during a call, the terminal repeats its attempt, for example at regular intervals as indicated by the parameter "TimeBetweenAttempts" in FIG. 7*c*, until the call is successful or until a predefined number of calls has been reached (parameter "NumberofAttempts" in FIG. 7*c*).

The standard exchanges are repeated, for example at regular intervals determined by a number of days between two standard exchanges ("TimeBetweenCalls" in FIG. 7*b*) and the time anticipated for such an exchange ("CallTime" in FIG. 7*b*).

The large number of terminals requires the server to dedicate a minimum amount of time to the processing of each request. It therefore is not possible to entirely validate the correction of the data upon receipt of a request message, before transmitting the return message. The terminal is asked to erase, from its memory, the data transmitted upon receipt of a normal response message. It is therefore possible that the data will be lost.

The consolidation server continues to ensure the statistical validity of the results, compensating for the possible loss of results in the following manner:
  The votes are not taken into account in the calculation of averages, standard deviations or other statistical values;
  The vote transactions are not counted in the number of transactions used to calculate the averages, standard deviations or other statistical values.

The protocol described above therefore optimizes the processing time period for each request in order to increase the number of terminals efficiently served by the consolidation server. This optimization is achieved at the risk of a loss of data. However, this loss of data does not result in the statistical invalidation of the results, which take into account all of the data.

The invention has been illustrated and described in detail in the figures and the description above. It must be considered to be illustrative and provided by way of an example, and not as limiting the invention to this single description. Numerous alternative embodiments are possible.

For example, the payment server, the consolidation server and the maintenance server of the terminal can be combined in two machines or even in a single machine; by contrast, the different functions of the payment terminal, data processing, display, keypad and interface can be separated in distinct devices, as can the different functions of the consolidation server. Numerous other alternative embodiments are possible.

In the claims, the word "including" does not rule out other features and the indefinite article "a/an" does not rule out a plurality.

The invention claimed is:

1. A method for acquiring data coming from a user at the time of a card payment transaction made using a payment terminal comprising:
  after closure of the card payment transaction, providing a data acquisition request on a screen of the payment terminal;
  acquiring the data by means of the payment terminal;
  validating the data acquired in the terminal; and
  if the data is valid, transmitting the data from the payment terminal to a consolidation server and providing the user with validation message on the screen of the payment terminal,
  wherein the data is anonymous and the data is considered to be invalid when, as the acquisition comprises a maximum time period parameter after the card payment transaction, the data is acquired after this maximum time period.

2. The method according to claim 1, wherein said method also comprises, if the data is invalid:
  transmitting failure information from the payment terminal to the consolidation server, and
  providing the user with a validation message on the screen of the terminal.

3. The method according to claim 1, wherein, if the payment transaction is a payment transaction using a smart card, said method comprises a step of validation based on the presence of the card.

4. The method according to claim 1, wherein the acquisition request and the provision thereof on the screen of the payment terminal are personalized by the consolidation server, then transmitted from the consolidation server to the payment terminal.

5. The method according to claim 1, wherein the transmitting of the data from the terminal to the consolidation server is considered to be completed by the terminal upon receipt of a response message sent by the consolidation server, in which said message is sent by the server before validation by the server of the data.

6. The method according to claim 5, wherein, if the data is not validated by the consolidation server, the data is not consolidated by the consolidation server and an overall statistical result is not affected by the data non-validated by non-consolidation of the acquisition request.

7. The method according to claim 1, wherein, as the acquisition request is part of a set of requests defining a survey campaign, in which said campaign is conducted via one or more payment terminals on which a plurality of payment transactions are preformed, a personalization is performed by the consolidation server in order to distribute the requests of the set of requests of the campaign being conducted over the plurality of payment transactions so that the consolidation of the data collected by the payment terminal(s) makes it possible to use the statistical law of large numbers in order to obtain statistically significant results.

8. The method according to claim 4, wherein the personalization takes into account non-identifying parameters associated with the user, coming from the consolidation server or the card of the user.

9. The method according to claim 4, wherein the acquisition request is adapted so as to collect a plurality of data consecutively.

10. The method according to claim 9, wherein the personalization defines a variable order of collection of the plurality of data, in which the variable order is dependent on parameters associated with the user.

11. The method according to claim 1, wherein, as the payment terminal comprises an interpreter of a series of instructions for displaying the acquisition request or a plurality of acquisition requests on the terminal and collecting the data or the plurality of data, said interpreter blocks backward branching instructions and limits operating time so that no series of instructions can lead to an endless execution.

12. The method according to claim 11, wherein, as the Personal Identifier Number (PIN) code of a card comprises N digits, N being a positive integer, the interpreter prohibits the entry of more than N-P data, with P is an integer being greater than or equal to 1, so as to prevent a series of instructions loaded malevolently in the terminal from leading the user to enter a secret code of the bank card.

13. The method according to claim 1, wherein the consolidation server associates the acquired data with non-identifying data qualifying the user via the time of acquisition of the acquired data.

14. A computer program comprising program code instructions recorded on a computer readable medium of a mobile device, for implementing the steps of a method as claimed in claim 1.

15. A statistical information collection system comprising a consolidation server, in which said consolidation server is connected to one or more payment terminals performing a plurality of payment transactions, and comprises:
  a storage for a list of questions to be asked to users;
  a computer calculating a query plan for the plurality of payment terminals, in which said plan defines, for each payment transaction, a sub-set of the list of questions;
  communication interfaces with each payment terminal for transmitting, to each terminal, the sub-sets of questions in the form of acquisition requests and for collecting data corresponding to the questions assigned to the terminal, in which the terminal(s) is (are) designed to implement the acquisition method according to claim 1;
  a storage for the list of answers returned by the users;
  a statistical computer for consolidation of the data acquired by using the statistical law of large numbers.

* * * * *